Nov. 21, 1933.     J. V. JARDINE     1,936,112
PIPE THREADING APPARATUS
Filed May 25, 1931     2 Sheets-Sheet 1
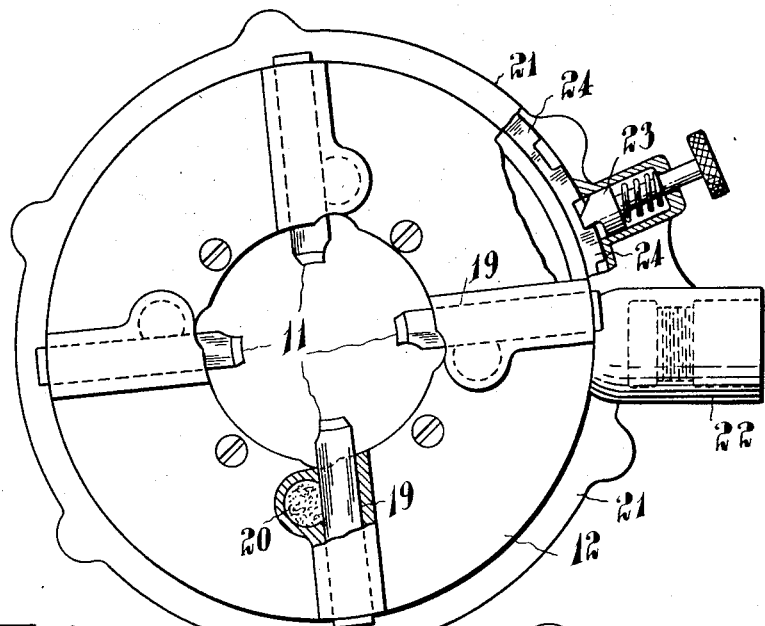
Fig.1.
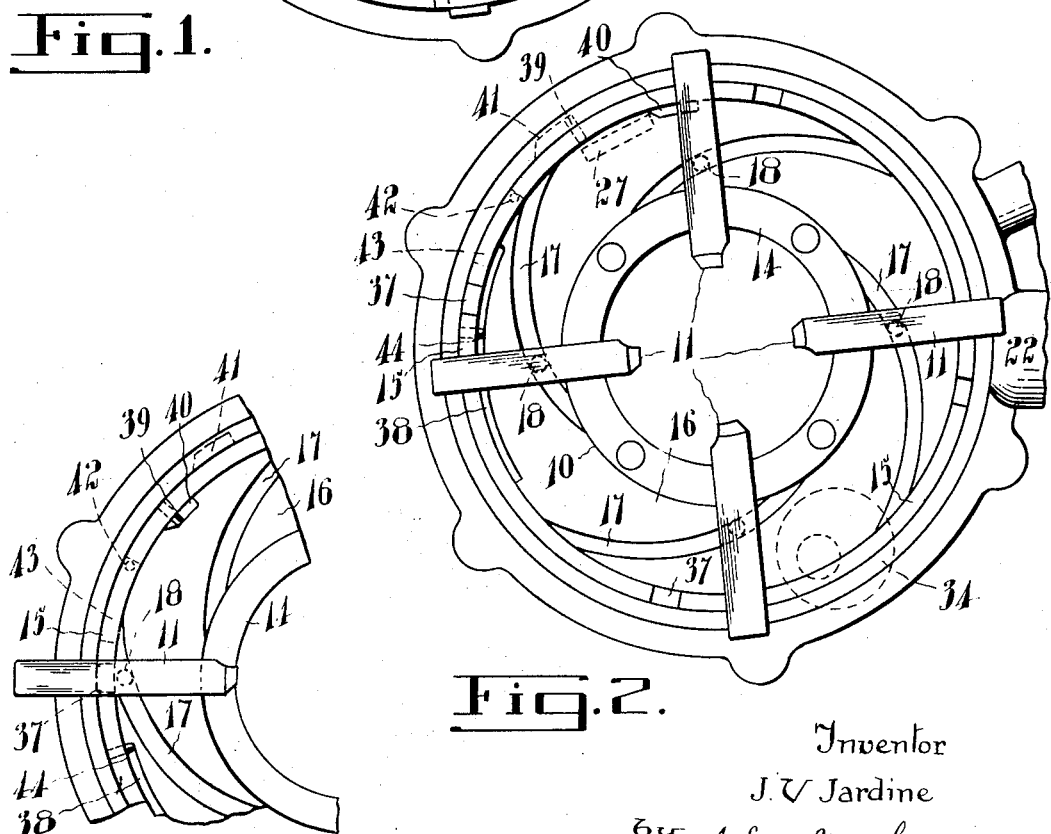
Fig.2.
Fig.3.
Inventor
J. V. Jardine
by J Edw Maybee
ATTY.

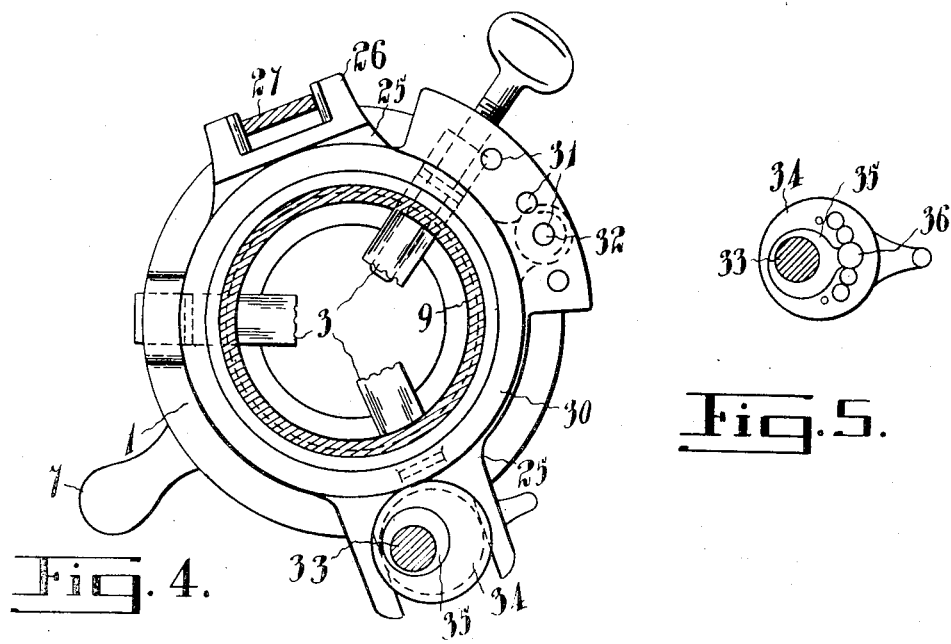
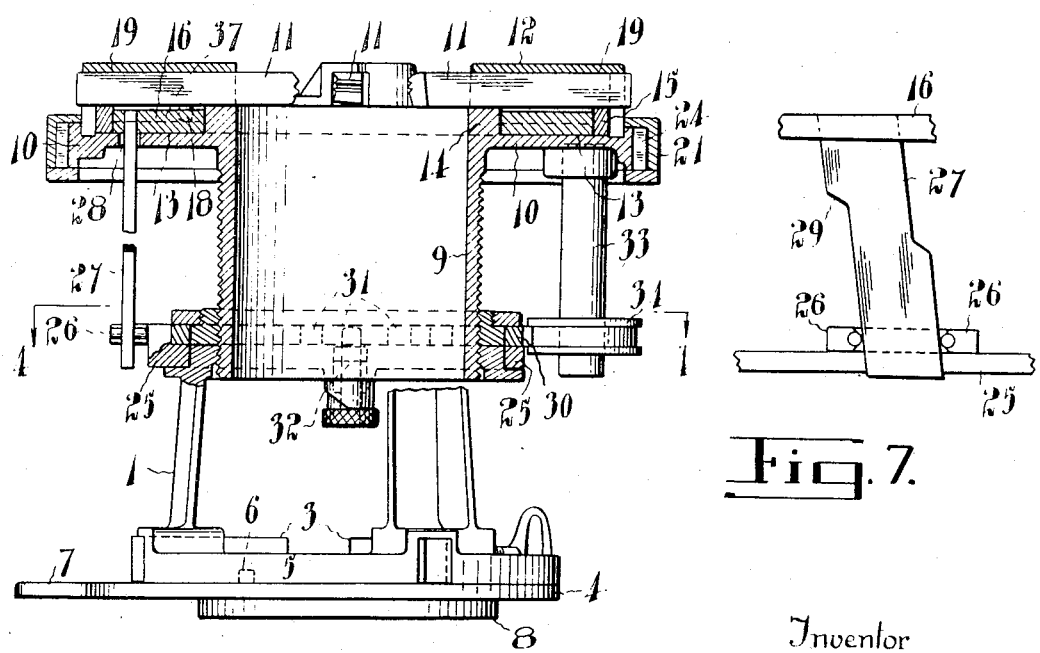

Patented Nov. 21, 1933

1,936,112

UNITED STATES PATENT OFFICE 1,936,112

PIPE THREADING APPARATUS

James Valten Jardine, Hespeler, Ontario, Canada

Application May 25, 1931, Serial No. 539,854, and in Canada March 16, 1931

9 Claims. (Cl. 10—96)

This invention relates to apparatus for threading pipes, rods and the like of the type in which a cam plate or adjustment ring is provided for advancing and retracting the chasers to position them for threading different diameters of work. In constructions at present in use adjustment is hindered through the fact that the chasers ride upon the face of the cam plate, and one object of my invention is to devise an arrangement by means of which the frictional engagement between the adjusting cam plate and chasers will be materially reduced.

A further object of my invention is to provide means for checking the passage of fine particles of metal cut by the chasers from working back along the surface of the chasers into the interior of the apparatus.

As pipe fittings manufactured in different plants have not always the same thread, so that a given piece of pipe will have a loose fit with one batch of fittings and a tight fit with another batch, a further object of my invention is therefore, to provide convenient and quickly adjustable means whereby not only may tight and loose threads be cut, but which will provide for several variations between said extremes.

A still further object is to devise improved means for securing a quick retraction of the chasers at the completion of the threading operation.

I attain my objects by means of the constructions hereinafter described and illustrated in the accompanying drawings in which Fig. 1 is a front view of the apparatus, partly broken away;

Fig. 2 a front elevation of the device, with the cover plate removed;

Fig. 3 a detail showing certain of the parts shown in Fig. 2, in another position;

Fig. 4 a rear elevation of the device;

Fig. 5 a detail of the adjusting means for cutting a tight or loose thread;

Fig. 6 a longitudinal section through the apparatus; and

Fig. 7 a detail of the cam post.

In the drawings like numerals of reference indicate corresponding parts in the different figures.

1 is the stationary frame, which is adapted to be clamped to the work, being provided adjacent one end with radially adjustable clamping members 3 for this purpose. For the purpose of adjusting these clamping members an adjusting ring 4 is rotatably mounted on the frame 1, which ring is provided with a spiral rib 5 which fits in a recess in the end of the frame 1, which rib meshes in notches 6 in the clamping members 3. The ring 4 is provided with a handle 7 to facilitate its adjustment, and is held in place by means of a ring 8 threaded on the frame 1.

The other end of the stationary frame is internally threaded to receive the tubular stem 9 of the rotary frame 10, which carries the thread-cutting chasers 11. This rotary frame is provided with a removable cover plate 12.

The rotary frame 10 is provided with an annular rib 14 surrounding the opening through the stem 9. Spaced from the rib 14 is a loose ring or rib 15, the space between said ribs forming a recess 13 in which a cam plate 16 is positioned. This cam plate 16 is provided with spiral grooves 17 which receive pins 18 carried by the chasers. The ribs 14 and 15 are slightly higher than the cam plate 16, from which it follows that the chasers, which rest on the ribs 14 and 15, do not exert any undue pressure on the cam plate, and therefore do not interfere with the movement of the cam plate relative to the rotary frame. The ring or rib 15 is provided with notches 37 for the passage of the chaser pins 18.

The chasers 11 are slidable in radial grooves 19 formed in the cover plate 12. As there is a tendency for fine cuttings to work back along the face of the chasers into the recess 13, I provide in the cover plate pads 20 adapted to bear against the chasers and prevent the passage of these cuttings. The pads may be saturated with oil, and thus serve the dual purpose of lubricating the chasers.

To rotate the frame 10, the latter is provided with a peripheral ring 21, made in two parts to facilitate assembly. This ring is provided with a socket 22 for the reception of a suitable handle. The outer periphery of the rotary frame 10 is provided with teeth 24, and the ring 21 is provided with a spring pressed plunger 23. The working face of the plunger 23 is inclined forwardly as shown more particularly in Fig. 1, to ensure a more certain engagement with the teeth 24 as well as to provide for wear, while its rear face is bevelled off so that when the ring is moved in the reverse direction, the plunger will be forced outwardly to ride over the teeth, thus obtaining a ratchet effect.

Rotatably mounted on the stationary frame 1 is a member 25 provided at one side with spaced shoulders 26 between which is adapted to be received a cam post 27 carried by the cam plate 16 and extending through an arc-shaped slot 28 in the rotary frame 10. As will be seen from Fig. 7, this cam post is inclined so that as the rotary frame moves up on the work, the cam plate 16 is slowly rotated to gradually retract the chasers, and thus give the thread being cut the necessary taper. This cam post at the end of the gradual taper is sharply tapered at 29. Thus, when the threading has been completed, the chasers may be moved rapidly away from the work.

As the apparatus is intended for threading several sizes of pipe, I provide a member 30 also rotatable on the stationary frame 1 relative to the member 25. This member is provided with a series of holes or recesses 31 in any one of which is adapted to be received a spring pressed plunger 32 carried by the member 25. The holes or recesses 31 are arranged so that when the plunger is in any one of them, the cam plate 16 will be positioned so that the chasers will be advanced to the proper position for threading the desired diameter of pipe or rod.

The members 25 and 30 are held in correct relation to the rotary frame 10 during the threading operation by means of a post 30 extending from said rotary frame.

To provide for a rapid advance or retraction of the chasers I provide on the post 33 extending from the rotary frame 10 an eccentric 34 mounted between the lugs integral with the member 30. By rotating the eccentric the cam plate may be partially rotated to rapidly advance or retract the chasers. To provide for the cutting of a loose or tight thread it is necessary that much finer adjustment than the regular "size" adjustment be provided. I therefore place within the large eccentric 34 a smaller eccentric 35 mounted direct on the post 33. This smaller eccentric is provided with a handle 36 in which is mounted a spring pressed plunger adapted to engage in any one of a series of notches in the eccentric 34. It will thus be seen that a very fine adjustment of the thread may be obtained to suit various sizes of fittings.

To effect the rotation of the cam plate 16 and ring 15 relative one to another and to the movable frame 10, I provide the following means:

In the outer periphery of the cam plate is formed an arc-shaped recess 38 into which projects a pin 44 carried by the ring 15. Slidable through a hole in the ring 15, is a pin 39, which is of a length that it must extend beyond one side or the other of the ring. The cam plate is provided with a recess 40 in its side, having one straight end and one inclined end, while the cover plate 12 is provided with a recess 41 also having one end straight and its other end inclined or bevelled. The ring 15 is provided with a pin 42 on its movable frame engaging surface, the movable frame being provided with a short notch 43 in which this pin extends. The grooves 17 in the cam plate 16 and the notches 37 in the ring 15 are arranged so that the chasers may only be inserted or removed when the chasers are retracted to their fullest extent, which is somewhat further than is necessary for the largest size work for which the apparatus is adapted. In this position the sliding pin 39 is in engagement with the inclined end of the notch 40. The apparatus is then set by retracting the plunger 32 and rotating the member 25, which causes the rotation of the cam plate 16 to advance the chasers and also through the pin 39 causes the rotation of the ring 15 until the pin 39 is opposite the recess 41, which is sufficient to bring an unnotched portion of the ring 15 beneath the chasers and thus relieve the cam plate from the pressure of the chasers while said ring is being rotated to cause the tapering of the thread. The rotation of the ring 15 is limited by the engagement of the pin 42 with the end of the slot 43 and further movement of the cam ring forces the pin 39 into the recess 41, thus permitting the cam ring to move on alone. When it is desired to remove the chasers for any reason, the cam ring is actuated through the medium of the member 25, until the end of the notch 38 engages the pin 44. Further movement of the cam plate thus rotates the ring to bring the notches 37 in alinement with the ends of the grooves 17.

In ordinary use, the chasers are simply set for threading the desired work, by advancing or retracting the chasers, as desired. Assuming a tight or loose thread is desired, the eccentric 35 may be adjusted to secure the fine adjustment of the chasers. The ring 21 is then rotated by means of the handle about the work, and through the connection of said ring with the rotary frame by means of the plunger 23, the rotary frame is actuated to carry the chasers about the work, and similarly through the threaded stem of said rotary frame, the frame is moved more and more on to the work. As the rotary frame advances on to the work, the cam post 27 causes a slight rotation of the cam plate, thus retracting the chasers to effect the tapering of the cut thread.

What I claim as my invention is:

1. In pipe threading apparatus, the combination of grooved chaser supporting means; chasers carried in said grooves; means for feeding and retracting said chasers; and a resilient pad mounted in the wall of the groove and bearing against the chaser for preventing the passage of cuttings to the feeding and retracting means.

2. In pipe threading apparatus, the combination of grooved chaser supporting means; chasers carried in said grooves; means for feeding and retracting said chasers; and a fibrous pad mounted in the wall of the groove and bearing against the chaser for preventing the passage of cuttings to the feeding and retracting means.

3. In pipe threading apparatus, the combination of a stationary frame; a rotary frame movable longitudinally relative to said stationary frame; chasers carried by said rotary frame; a cam plate movable on the rotary frame controlling the chasers; means for effecting relative movement between the cam plate and rotary frame during rotation of the latter; other means for adjusting the relative positions of said cam plate and rotary frame, said last mentioned means including an adjusting member rotatably mounted on the stationary frame normally rotatable with said rotary frame; a post secured to the rotary frame for rotating said adjusting member with said rotary frame; and two eccentrics one within the other rotatable about said post, the inner eccentric engaging the post and the outer eccentric engaging the adjusting member.

4. In pipe threading apparatus, the combination of a stationary frame; a rotary frame movable longitudinally relative to said stationary frame; chasers carried by said rotary frame; a cam plate movable on the rotary frame controlling the chasers; means for effecting relative movement between the cam plate and rotary frame during rotation of the latter; other means for adjusting the relative positions of said cam plate and rotary frame, said last mentioned means including an adjusting member rotatably mounted on the stationary frame normally rotatable with said rotary frame; a post secured to the rotary frame for rotating said adjusting member with said rotary frame; two eccentrics one within the other rotatable about said post, the inner eccentric engaging the post and the outer eccentric engaging the adjusting member; and releasable means for locking the inner eccentric in position relative to the outer eccentric.

5. In pipe threading apparatus, the combination of a stationary frame; a rotary frame longitudinally movable relative to the stationary frame; chasers carried by the rotary frame; a cam plate movable on the rotary frame controlling the chasers; a cam plate actuating member rotatable on said stationary frame; an adjusting member also rotatable on said stationary frame and driven by the rotary frame; means for giving the cam plate actuating member and adjusting member a driving engagement with one another; means for adjusting the position of the adjusting member relative to the rotary frame, said last mentioned means comprising a post secured to the rotary frame; and two eccentrics one within the other, the inner eccentric engaging the post and the outer eccentric engaging the adjusting member.

6. In pipe threading apparatus, the combination of a stationary frame; a rotary frame longitudinally movable relative to the stationary frame; chasers carried by the rotary frame; a cam plate movable on the rotary frame controlling the chasers; a cam plate actuating member rotatable on said stationary frame; an adjusting member also rotatable on said stationary frame and driven by the rotary frame; means for giving the cam plate actuating member and adjusting member a driving engagement with one another; means for adjusting the position of the adjusting member relative to the rotary frame, said last mentioned means comprising a post secured to the rotary frame; two eccentrics one within the other, the inner eccentric engaging the post and the outer eccentric engaging the adjusting member; and releasable means for locking the inner eccentric in position relative to the outer eccentric.

7. In pipe threading apparatus, the combination of a stationary frame; a rotary frame movable longitudinally relative to the stationary frame; chasers carried by the rotary frame, said rotary frame having an annular recess therein; and a cam plate rotatable in said recess for controlling the chasers, the outer wall of said recess being formed as an annular movable rib having notches formed therein for the insertion of the chasers, said rib having a shoulder on its inner periphery and said cam plate an arc-shaped recess in which said shoulder may travel, a pin of greater length than the thickness of the rib slidable through the rib, said cam plate and rotary frame each having a recess formed therein into which said sliding pin may project, the end of each of said last mentioned recesses being bevelled, the bevelled end of the recess in the cam plate being positioned to engage the sliding pin and rotate the rib in one direction until the pin is opposite the recess in the rotary frame and force the pin into said recess, the end of the arc-shaped recess in the cam plate being adapted to move the rib in the reverse direction.

8. In pipe threading apparatus, the combination of a stationary frame; a rotary frame movable longitudinally relative to the stationary frame; chasers carried by the rotary frame, said rotary frame having an annular recess therein; and a cam plate rotatable in said recess for controlling the chasers, the outer wall of said recess being formed as an annular movable rib having notches formed therein for the insertion of the chasers, said rib having a shoulder on its inner periphery and said cam plate an arc-shaped recess in which said shoulder may travel, a pin of greater length than the thickness of the rib slidable through the rib, said cam plate and rotary frame each having a recess formed therein into which said sliding pin may project, the end of each of said last mentioned recesses being bevelled, the bevelled end of the recess in the cam plate being positioned to engage the sliding pin and rotate the rib in one direction until the pin is opposite the recess in the rotary frame and force the pin into said recess, the end of the arc-shaped recess in the cam plate being adapted to move the rib in the reverse direction, said rib and rotary frame being provided with a pin and slot connection to limit the movement of the rib relative to the rotary frame.

9. In pipe threading apparatus, the combination of a stationary frame; a rotary frame movable longitudinally relative to the stationary frame; chasers carried by the rotary frame, said rotary frame having an annular recess therein; a cam plate rotatable in said recess and having cam grooves therein for controlling the chasers, said chasers having projections thereon engaging in said cam grooves, the outer wall of said recess being formed as an annular movable rib having notches formed therein for the passage of the projections; and means for causing a partial rotation of the annular rib to move said notches into or out of alinement with the cam grooves during the threading operation.

JAMES V. JARDINE.